US007926885B2

(12) United States Patent
Saillet et al.

(10) Patent No.: US 7,926,885 B2
(45) Date of Patent: Apr. 19, 2011

(54) SPOKED WHEEL AND A SPOKE MADE WITH A COMPOSITE MATERIAL (75) Inventors: Benoit Saillet, Albens (FR); Philippe Renard, Aix les Bains (FR); Claude Righini, Veyrier du Lac (FR)

(73) Assignee: Salomon S.A.S., Metz-Tessy (FR)

( * ) Notice: Subject to any disclaimer, the term of this patent is extended or adjusted under 35 U.S.C. 154(b) by 0 days.

(21) Appl. No.: 12/028,137

(22) Filed: Feb. 8, 2008

(65) Prior Publication Data

US 2008/0191543 A1 Aug. 14, 2008

(30) Foreign Application Priority Data

Feb. 9, 2007 (FR) ...................................... 07 00921

(51) Int. Cl.
*B60B 5/00* (2006.01)
*B60B 1/04* (2006.01)
(52) U.S. Cl. .............................. 301/104; 301/58; 301/59
(58) Field of Classification Search .................... 301/55, 301/56, 57, 58, 59, 104
See application file for complete search history.

(56) References Cited

U.S. PATENT DOCUMENTS

| 644,968 | A | * | 3/1900 | Crawford et al. ............... 301/58 |
| 703,029 | A | * | 6/1902 | Wilske ........................... 301/6.5 |
| 4,729,605 | A | * | 3/1988 | Imao et al. ..................... 301/104 |
| 5,104,199 | A | | 4/1992 | Schlanger |
| 5,110,190 | A | | 5/1992 | Johnson |
| 5,350,221 | A | * | 9/1994 | Pearce et al. .................. 301/104 |
| 5,779,323 | A | * | 7/1998 | Burrows ......................... 301/58 |
| 5,915,796 | A | | 6/1999 | Beyer |
| 6,036,279 | A | * | 3/2000 | Campagnolo .................. 301/55 |
| 6,520,595 | B1 | * | 2/2003 | Schlanger ....................... 301/59 |
| 6,761,847 | B2 | | 7/2004 | Meggiolan |
| 6,783,192 | B2 | * | 8/2004 | Meggiolan ................. 301/110.5 |
| 6,899,401 | B2 | * | 5/2005 | Schlanger ....................... 301/59 |

FOREIGN PATENT DOCUMENTS

| EP | 1 044 827 A1 | 10/2000 |
| EP | 1 231 077 A2 | 8/2002 |
| EP | 1 304 238 A1 | 4/2003 |
| FR | 2 761 300 A1 | 10/1998 |
| WO | WO-91/13771 A2 | 9/1991 |
| WO | WO-93/19944 A1 | 10/1993 |
| WO | WO-00/35683 A1 | 6/2000 |

* cited by examiner

*Primary Examiner* — S. Joseph Morano
*Assistant Examiner* — Kip T Kotter
(74) *Attorney, Agent, or Firm* — Greenblum & Bernstein, P.L.C.

(57) ABSTRACT

A spoke for a tension wheel, the spoke being made of a composite material and including a tension body, the body having a median portion and two ends, the body being extended beyond each end by a fastening segment, the body and the fastening segments being connected by a transitional zone. The spoke has at least one portion with a cross-sectional surface reinforced relative to the cross section of the median portion, the reinforced cross-sectional portion extending through at least one transitional zone between the tension body and the embedded fastening segment.

35 Claims, 4 Drawing Sheets

SPOKED WHEEL AND A SPOKE MADE WITH A COMPOSITE MATERIAL

CROSS-REFERENCE TO RELATED APPLICATION

This application claims priority under 35 U.S.C. §119 of French Patent Application No. 07 00921, filed on Feb. 9, 2007, the disclosure of which is hereby incorporated by reference thereto in its entirety.

BACKGROUND OF THE INVENTION

1. Field of the Invention

The invention relates to a spoke made of a composite material for a tension-spoke wheel, as well as to a wheel including such a spoke, especially a wheel whose rim and/or hub are also made of a composite material.

2. Description of Background and Other Information

Conventionally, a tension-spoke wheel, such as a bicycle wheel in particular, includes a peripheral rim, a central hub, and spokes connecting the rim to the hub. Generally, these various elements are entirely or partially made of metal or of a composite material.

Typically, such a composite material is constituted of fibers with high mechanical properties, especially carbon fibers or fibers of an equivalent material that are embedded in a resin matrix. Composite materials have a very high ratio between the modulus of elasticity (E) (tension) and density (d). This ratio yields the specific modulus of the material.

For carbon, E=115,000 MPa (MegaPascals) and d=1.55 for UD carbon fibers. By comparison, for stainless steel, E=190,000 MPa and d=7.8;
for titanium, E=110,000 MPa and d=4.55;
for aluminum, E=71,000 MPa and d=2.8.

Carbon, because of its high specific modulus, spokes can be made that are rigid and strong in tension but which have a reduced volume and a reduced weight. A spoke made of carbon fibers also has a high fatigue strength. Moreover, such spokes can easily be shaped in a mold and, in particular, can be given an aerodynamic profile.

It is also known to make a rim out of a composite material, starting with a core that is wrapped in layers of composite material, or with an inflatable bladder, or yet with two rim portions assembled to one another. Patent documents EP1231077 and U.S. Pat. No. 6,761,847 describe the construction of such a rim made of a composite material.

Patent documents WO00/35683 and U.S. Pat. No. 6,899,401 describe the construction of a wheel, the spokes of which are made of a composite material.

To fasten composite spokes to a rim, patent document EP1044827 proposes to bend the spoke ends over themselves on a core in order to form a buckle, the cross section of which is expanded by means of a central core. The ends are fastened, either directly by nesting the expanded portion in a housing of the hub, or via an auxiliary end piece forming a cap for fastening to the rim.

Patent document U.S. Pat. No. 6,036,279 discloses a construction of the same type. The spoke ends are flattened to form enlarged heads. One of the T-shaped heads is fastened to the hub by being embedded therein, the other being fixed to an intermediate cap.

These methods of construction yield good results; however, they require the use of auxiliary elements, especially metallic elements that weigh down the wheel.

Another solution involves making a rim, spokes and, if necessary, a hub body out of composite material, and assembling these various elements by gluing with resin that forms the matrix of the composite material, or with glue.

Patent documents WO93/19944 and U.S. Pat. No. 5,104,199 describe a construction of this type, in which the spokes are assembled directly to the rim and to a central flange. The wheel is thus made in two monolithic halves that are then assembled to one another. To tension the spokes and to form the hub body, the two central flanges are spaced apart, and a spacer is positioned to keep them at the predefined spacing.

The wheel built in this manner is light and rigid. Indeed, the lack of auxiliary fastening elements allows for a significant weight reduction.

However, fixing the spoke directly to the rim deprives the connection between these two elements of any degree of freedom that was previously available with a nested connection or when fastened via a cap. Moreover, the rim and the spoke are two completely different elements geometrically. A spoke made of a composite material is slightly flexible or not flexible, mainly in a plane in which it has its largest cross-sectional dimension. In any event, it is markedly less flexible than a metallic spoke. Thus, it has been noted that certain impacts applied to the wheel, in particular frontal impacts, could weaken the spoke in the area of its connection with the rim, and therefore could diminish its fatigue strength.

A similar problem arises in the area of the hub if, in the same fashion, the spoke made of a composite material is assembled to the hub via complete embedding, without any degree of freedom.

SUMMARY OF THE INVENTION

The invention provides for a spoke made of a composite material, which is improved in that it has a higher fatigue strength and/or impact strength.

In addition, the invention provides a wheel that includes a rim, a hub, and at least one spoke made of a composite material, which is improved in that the spoke(s) made of a composite material have a higher fatigue strength and/or impact strength.

Further, the invention provides a wheel construction combining lightness and impact strength.

Still further, the invention improves the impact strength of the embedded composite assemblies.

Other advantages will become apparent from the description that follows.

The spoke of the tension-spoke wheel according to the invention is made of a composite material. It includes an elongated tension body, the body having a median portion and two ends. The body is extended beyond each end by a fastening segment, at least one of the fastening segments being an embedded fastening segment, the body and the fastening segments being connected by a transitional zone, the body having a predefined cross section and perimeter in its median portion.

The spoke has at least one cross-sectional portion that is reinforced in the cross section surface, relative to the cross section of the median portion, the reinforced cross-sectional portion covering, i.e., extending through, at least one transitional zone between the tension body and the embedded fastening segment.

The tension-spoke wheel includes a rim, a central hub body and at least one spoke for connection between the rim and the hub, the spoke being made of a composite material. The spoke includes an elongated tension body having a median portion and two ends. The body is extended beyond each end by a fastening segment, at least one of the fastening segments being an embedded fastening segment, the body and the fastening segments being connected by a transitional zone, the body having a predefined cross-section and perimeter in its median portion.

The spoke of the wheel has at least one cross-sectional portion that is reinforced in the cross section surface, relative to the cross section of the median portion, the reinforced cross-sectional portion covering, or extending through, at least one transitional zone between the tension body and the embedded fastening segment.

Thus reinforcing the cross section of the spoke body in the transitional zone increases the strength of the embedded connection while preserving a spoke that is both light and aerodynamic.

The invention will be better understood from the description that follows, with reference to the attached drawings, in which.

Figure 1:
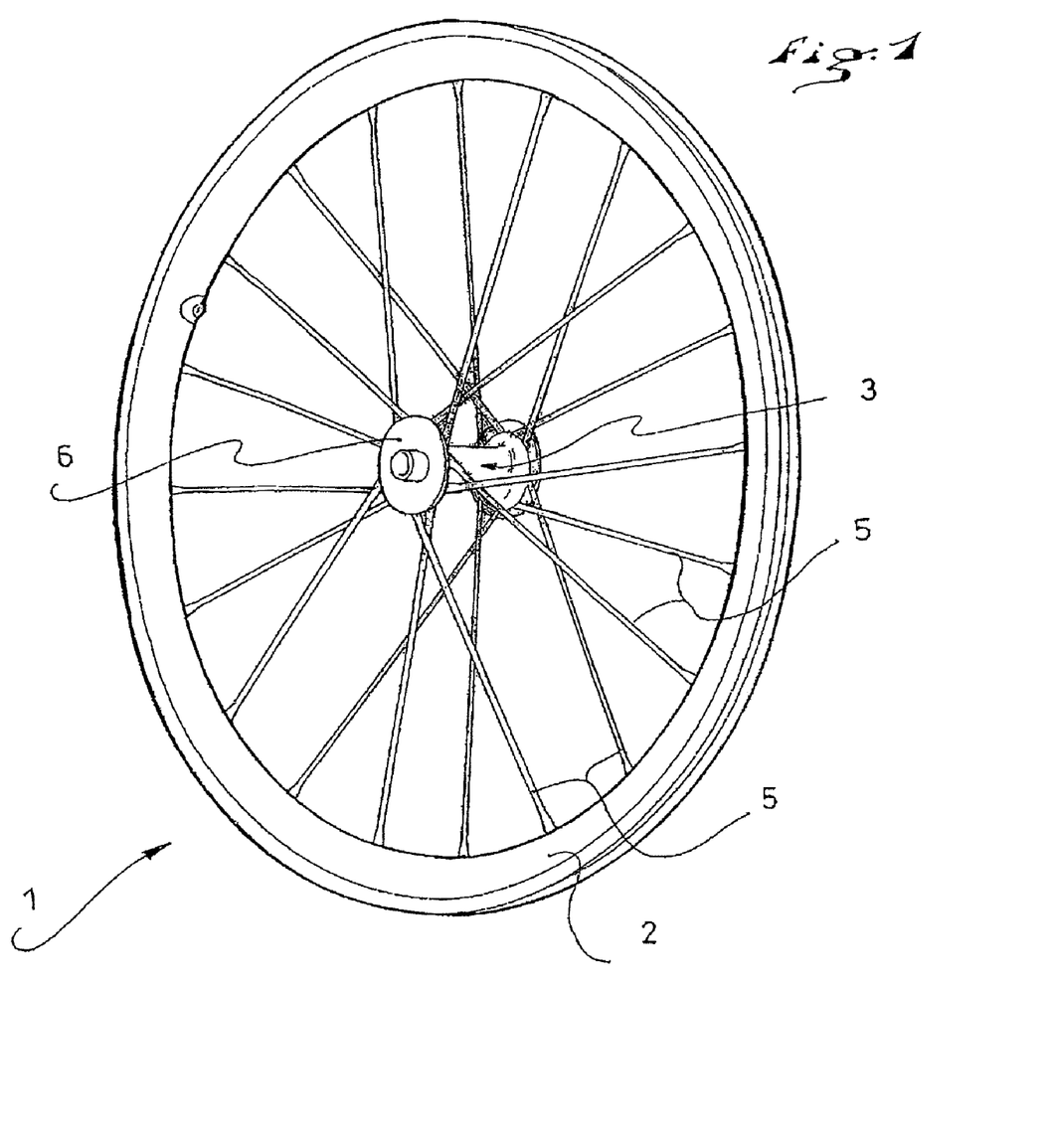
FIG. 1 is a general view of a tension-spoke wheel according to the invention.

FIG. 1 illustrates a tension-spoke wheel 1 provided for a bicycle. The wheel is a front wheel, which is non-limiting, as the invention applies in the same manner to a rear wheel. The wheel 1 conventionally includes a peripheral rim 2, a hub 3, and spokes 5 connecting the rim and the hub. As is conventional, the hub has a central axial portion, as well as a hub body 6, projecting away from the central portion, and to which the spokes are fastened, the hub body being rotationally movable about a shaft for connection with a bicycle frame (not shown in the drawing).

According to the illustrated embodiment, the spokes 5 are made of a composite material, constituted, e.g., of carbon or aramid fibers, or an equivalent, that are embedded in an epoxy, polyester, or any other appropriate type of resin matrix. In a particular embodiment, the fibers are unidirectional fibers directed along the longitudinal direction defined by the spoke. However, this is not limiting, as criss-crossed fibers are suitable.

Figures 2, 3:
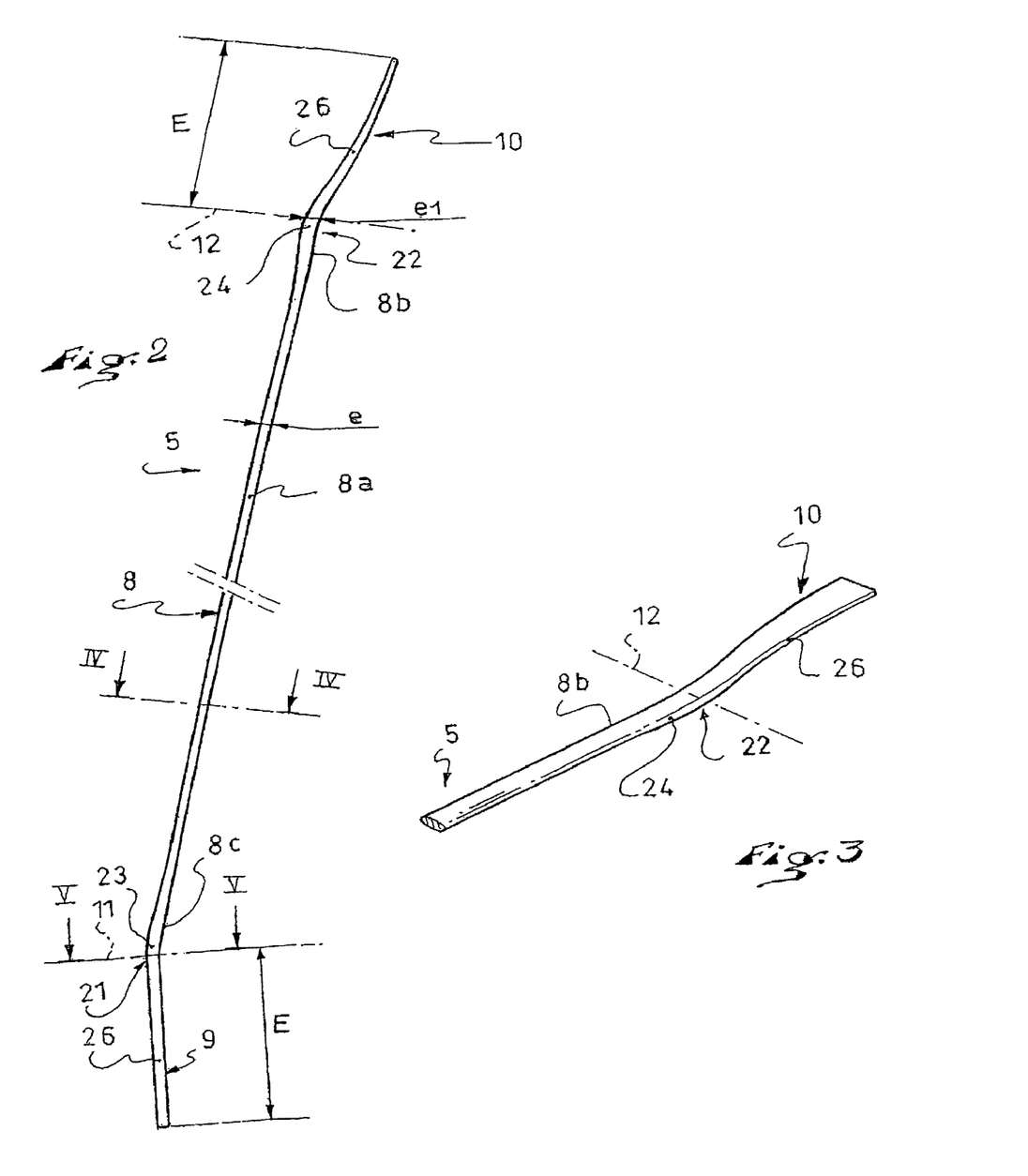
FIG. 2 shows a spoke along a direction perpendicular to the rotational axis of the wheel.
FIG. 3 shows a fastening segment of the spoke on an enlarged scale.

A spoke 5 is shown in FIG. 2 in the direction of a plane passing through the wheel rotational axis. The spoke has an elongated tension body 8. The body 8 is the visible portion of the spoke, when the spoke is assembled to the rim and to the hub. The body 8 is a tension body, meaning that it is provided to be constrained in tension by the rim and the hub. The body 8 has a median portion 8a and two ends 8b and 8c.

Beyond the ends, the body is extended by fastening segments 9 and 10, respectively. The segments are in continuity with the body, i.e., the same fibers constitute the composite material of the body and of the fastening segments. At least one of the fastening segments, and the two fastening segments 9 and 10, for the example shown, are provided to be embedded in the hub and the rim, respectively. In other words, once assembled to the rim and the hub, these segments are no longer visible as such; they are hidden by the rim and the hub. The embedding is described in greater detail below.

The transition between the body 8 and the segments 9, 10 is marked by the broken lines 11 and 12 in FIGS. 2 and 3. The transitional zones 11 and 12 correspond to the boundary between the visible portion of the spoke and the embedding portions of the spoke 5 that are hidden by the rim or the hub once the spoke is assembled, namely the embedding zone E. In these transitional zones 11 and 12, the fastening segments 9 and 10 form an elbow with the body 8 in order to provide a contact surface that matches the contact surface of the hub and of the rim, respectively. FIG. 2 also shows that the fastening segment 10 is slightly curved. The fastening segment 10 is intended to assume the outwardly facing convex shape of the rim, in cross section.

The body 8 has a substantially constant predefined cross section in its median portion 8a, and a substantially constant predefined perimeter. This cross section can be shaped so as to provide the spoke with an aerodynamic profile. Usually, the spoke cross section has, in a plane perpendicular to the axial plane of FIG. 2, a width l that is greater than its thickness e in the plane of FIG. 2, in order to have good aerodynamic properties (see FIG. 5).

In the area of the fastening segments 9, 10, the cross section of the spoke can be flattened in order to increase the surface of contact with the rim and the hub. One can also add yokes in these zones in order to improve adherence, especially with the rim.

The spokes 5 can be individual spokes, such as the one shown in FIG. 2, or can be made in pairs, i.e., two butt joined spokes in the continuity of one another having, in the median portion of this assembly, a zone that forms the segments for fastening the two spokes to the hub, so as to form a diametrical assembly of two spokes. This is known to one with ordinary skill in the art.

According to a particular embodiment of the invention, the rim 2 and/or the hub body 6 are also made of a composite material. In this way, the spoke can be fastened to the rim and/or the hub by being embedded, i.e., by means of glue or of one and/or the other of the matrices coating the fibers that constitute the rim and/or the hub. Such an embedded fastening inherently suppresses any degree of freedom in the area of the connection.

Figure 4:
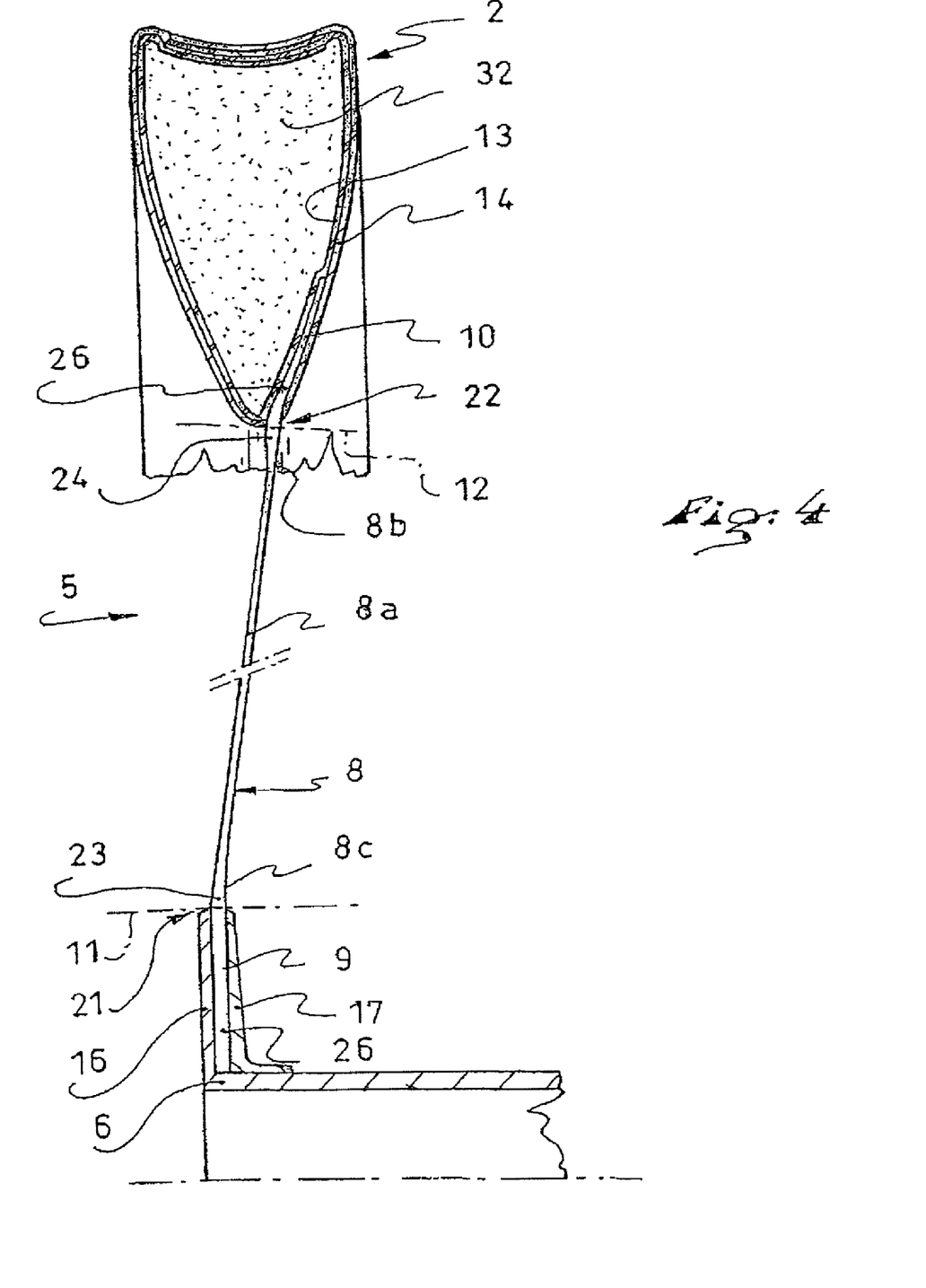
FIG. 4 shows the spoke of FIG. 2, as assembled to the rim on one side and to the hub body on the other side, these two elements being shown in cross section.

For example, as shown in FIG. 4, the rim is formed from a foam core 32 that is wrapped in resin-coated fiber layers 13 and 14. The number and arrangement of the layers are not limiting. Other methods of construction are suitable; in particular, instead of a foam core, one could use an inflatable bladder and shape the rim in a mold.

The rim has any appropriate shape in cross section. The rim shown is provided to receive a tube, which is not limiting, as the rim could be shaped like a box in cross section, with two wings defining a channel for receiving a tire and its inner tube, as is described in the patent document EP 1231077 cited in the background above, or could have any other appropriate shape. The rim can also have an asymmetrical cross-section.

Embedding the segment 10 for fastening a spoke 5 to the rim can be done by surface adhesion of the segment for fastening the spokes to the inner or outer wall of the rim, or by insertion of the fastening segment between the layers of the rim during the manufacture thereof. Other assembling techniques are also suited. The rim and the spokes can be made separately and then assembled, or the assembly can be accomplished during the manufacture of one and/or the other of these elements, i.e., they are cured together.

According to the illustrated embodiment, the fastening segment 10 is applied by being sandwiched between two layers of the rim, and therefore against the inner wall of the rim. The excess thickness resulting from this application is intentionally exaggerated in FIG. 4.

In the same fashion, the fastening segment 9 is embedded in the hub body 6. For example, as shown, the hub body has a radial shoulder 16 on each of its ends, and the segments for fastening the spokes are sandwiched between this shoulder 16 and a flange 17 that is applied against the radial shoulder 16. The embedding is carried out using glue or the resin matrix of one and/or the other of these elements.

As shown in FIG. 4, the embedding portion of the fastening segment 10 of the spoke extends in a direction substantially parallel to an outer surface of the rim 2 that faces axially outwardly of a median plane of the rim (such plane being perpendicular to the axis of the hub), and the terminal end of the fastening segment 10 is unexposed. Likewise, as also shown in FIG. 4, the embedding portion of the fastening segment 9 of the spoke extends in a direction substantially parallel to an outer surface of the hub body 6, i.e., substantially parallel to an outer surface of the shoulder 16 of the hub body 6, which faces axially outwardly of a median plane of the rim, and the terminal end of the fastening segment 9 is unexposed.

To improve the fatigue strength of the spoke 5, its cross section is locally reinforced in the area of the fastening segments 9, 10. The local reinforcement is carried out by adding composite material and, in this case, by adding fibers that locally extend the surface and strength of the material. The cross section is reinforced at least inside of or in the area of the transitional zone 11, 12, between the spoke body and the fastening segments. Once the spoke is fastened, these transitional zones 11, 12 are located either inside or outside the rim or the hub, or both. The reinforcement of the spoke in cross section has the effect of increasing the embedding strength of the spoke in this portion, in which the stresses are high due precisely to the embedding, and therefore its resistance, particularly to frontal impacts. The intermediate zones 23, 24 have a progressive cross-sectional increase between the body 8 and the fastening segments 9, 10.

According to one embodiment, the reinforced cross-sectional portion covers the transitional zone 11, 12 and extends upstream of this zone over a short distance, i.e., in the direction of the median portion 8a of the body, i.e., outside the embedding zone E, i.e., beyond the embedding portion of the fastening segment of the spoke. Moreover, the variation in cross section between the median portion of the body and the reinforced cross-sectional portion is progressive, i.e., the cross section increases and varies uniformly over a first intermediate portion 23, 24 that precedes the reinforced cross-sectional portion.

Beyond the transitional zone 11, 12, i.e., in the area of the end of the fastening segment 9, 10, several constructions are possible. The first possible construction is that the cross section remains constant in surface/quantity of material, i.e., the quantity of composite material does not change; or the cross section is reduced back to a cross section having a smaller quantity of material, especially the same as that of the spoke body in its median portion. In this case, as has already been mentioned, the cross section can vary and diminish uniformly in a second intermediate portion 26.

The spoke shown in FIGS. 2 and 3 has reinforced cross-sectional portions 21, 22 that cover each of the transitional zones 11 and 12. The reinforced cross-sectional portions extend upstream of the transitional zones toward the median portion 8a of the spoke body, and are extended by intermediate portions 23 and 24 having a progressive cross section.

For the segment 10 for fastening to the rim, the reinforced cross-sectional portion 22 is also extended downstream of the transition 12, i.e., inside the embedding zone E itself, i.e., within the embedding portion of the fastening segment of the spoke. The segment 10 has an intermediate portion 26 in which the cross section varies and diminishes uniformly.

For the fastening segment 9, the reinforced cross-sectional portion 21 extends beyond the transition 11 and covers the length of the segment 9, i.e., the entire embedding zone E, i.e. the entire embedding portion of the spoke.

In a particular embodiment, the cross-sectional increase in the reinforced cross-sectional portions is between 20 and 100%. This corresponds to the increase in the material surface or in the number of fibers of the cross section relative to the median portion 8a of the spoke body.

In a specific spoke built for a road wheel, the cross section has a 4 mm$^2$ surface area in the median portion of the body, and a 6 mm$^2$ surface area in the reinforced cross-sectional portions. The length of each of the fastening segments 9, 10 is greater than 30 millimeters.

On the side of the segment for fastening to the rim, the reinforced cross-sectional portion 22 extends over a length in the order of at least 5 millimeters beyond the transition 12 toward the median portion of the body, i.e., in the visible portion of the spoke body or outside of the embedding zone/portion, and the intermediate portion 24 with progressive cross section has a length of at least 2 millimeters.

Toward the rim, i.e., within the zone E for embedding the spoke in the rim, the reinforced cross-sectional portion extends over a length of at least 2 millimeters beyond the transition 12, along the fastening segment 10, and the intermediate portion 24 has a length of at least 2 millimeters.

On the side of the segment 9 for fastening to the hub, the cross-sectional increase in the reinforced cross-sectional portion is on the same order. The reinforced cross-sectional portion extends over a length greater than 5 millimeters beyond the transition 11, in the direction of the median portion of the spoke body, i.e., outside the embedding zone E (i.e., beyond the embedding portion of the spoke), the intermediate portion 23, i.e., inside the embedding zone E (i.e., within the embedding portion of the spoke), has a length greater than 2 millimeters.

Figure 5:
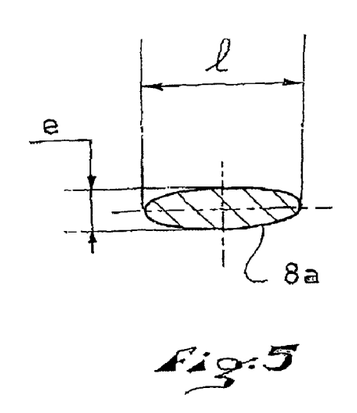
FIG. 5 shows a cross section of the spoke, in the area of the median portion of the body, in cross section along the line IV-IV of FIG. 2.
Figure 6:
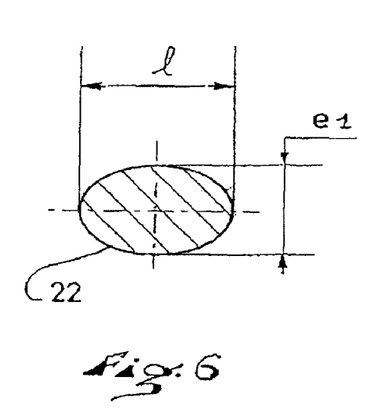
FIG. 6 shows the spoke cross section in the area of a cross-sectional portion reinforced in cross section along the line V-V of FIG. 2.

In a particular embodiment, as shown in FIGS. 5 and 6, the spoke cross section in the median portion 8a has a generally ellipsis-shaped, flattened form having a large dimension or width l oriented in a perpendicular plane with respect to the rotational axis of the wheel and a small dimension or thickness e oriented in a parallel plane with respect to such axis. FIG. 6 shows the cross section of the reinforced cross-sectional portion 22. The cross-sectional increase does not significantly modify the width l; it mainly affects the thickness $e_1$, which is greater than the thickness e of the previous portion 8a. Stated in another way, the width of the spoke (defined as transverse to the plane of the rotational axis of the wheel) in the reinforced cross-sectional portion 22 of the spoke is substantially equal to the width of the spoke in the median portion 8a of the spoke.

Good results are obtained with a spoke built in this manner. However, this is not limiting, and the values used are provided for information only. In particular, the cross-sectional variation or non-variation is not limiting with respect to the fastening of the spoke to the rim and to the hub.

Figure 7:
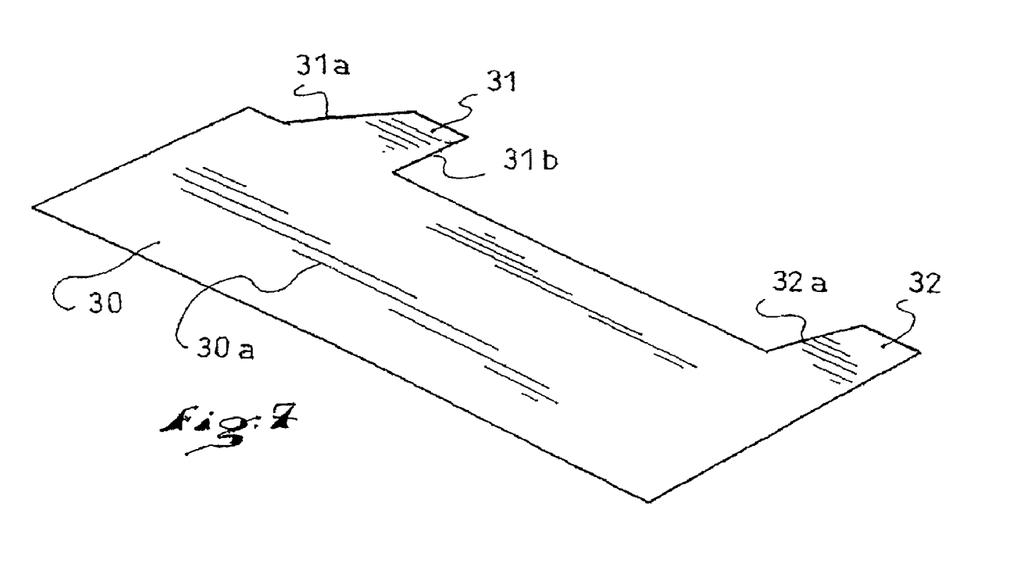
FIG. 7 shows a method of making a spoke.

FIG. 7 schematically illustrates a method of making the spoke that has just been described.

One starts with a layer 30 of unidirectional or crisscrossed composite fibers 30a (for example, carbon or Kevlar fibers) coated with resin (for example, epoxy resin), which is cut and then rolled. The layer has a constant width over the largest portion of its length, and it has two lateral extensions 31, 32 which, once rolled, form an excess thickness. After the resin has been cured, the excess thicknesses become the reinforced cross-sectional portions 21, 22 of the spoke. These portions 21, 22 are reinforced not only in cross section but also in the material (carbon or Kevlar fibers, for example, having great mechanical properties).

The intermediate portions are obtained by means of an oblique cut 31a, 31b, 32a of the extensions.

Other methods of manufacture are also suitable. For example, during the manufacture of the spoke, a yoke of pre-impregnated fibers can be attached toward each of the ends in order to reinforce these portions, not only in cross section, but also in the material (carbon/Kevlar fibers) having high mechanical properties.

Thus, the local reinforcement of the spoke cross section in the embedding zones makes it possible to increase the strength of the spoke in this zone while preserving its lightness and aerodynamic properties.

The present description is only given by way of example, and other embodiments of the invention could be adopted without leaving the scope thereof.

In particular, the invention encompasses to a spoke made of composite material, which would have only one end embedded in the rim or in the hub, the other end being fastened by another means. This can be the case if, for example, the rim or the hub body is made of a metallic alloy. A wheel can also be built with only part of the spokes being made according to what has just been described.

The invention claimed is:

1. A spoke for a tension-spoke wheel, said spoke comprising:
    a tension body comprising a median portion, a first end and a second end, said median portion extending along a length of the tension body between said first end and said second end;
    a first fastening segment extending between a first end of the spoke and said first end of said tension body and a second fastening segment extending between a second end of the spoke and said second end of said tension body;
    said tension body and said first and second fastening segments of said spoke being made of a composite material;
    at least the first fastening segment comprising an embedding portion constructed and arranged to be embedded in a rim, said embedding portion having a non-circular cross section;
    said first end of the spoke comprising a size and a shape to be received and retained within the rim;
    the tension body and the fastening segments being bounded by respective transitional zones;
    the tension body having a cross section and perimeter in the median portion of the tension body;
    at least one cross-sectional portion reinforced in cross section relative to the cross section of the median portion of the tension body, a predetermined one of said at least one reinforced cross-sectional portion extending along a portion of the first end of the tension body, through at least one said transitional zone, and along a portion of the embedding portion of the first fastening segment;
    each of said at least one reinforced cross-sectional portion having a thickness greater than a thickness of the median portion, said thickness extending to be substantially parallel to a rotational axis of the wheel.

2. A spoke according to claim 1, wherein:
the reinforced cross-sectional portion has a cross section surface, said cross section surface being 20% to 100% greater than the cross section surface of the median portion of the body.

3. A spoke according to claim 1, wherein:
the at least one reinforced cross-sectional portion extends over a length of at least 5 millimeters from the transitional zone toward the median portion of the body.

4. A spoke according to claim 1, wherein:
the reinforced cross-sectional portion extends beyond and/or within the embedding portion of said embedded fastening segment.

5. A spoke according to claim 1, wherein:
the reinforced cross-sectional portion extends through at least 2 mm within the embedding portion of said first fastening segment.

6. A spoke according to claim 5, wherein:
an intermediate portion extends over a length of at least 2 millimeters from the transitional zone.

7. A spoke according to claim 1, further comprising:
an intermediate portion having a uniform cross-sectional variation between the cross section in the median portion of the body and the cross section in the reinforced cross-sectional portion.

8. A spoke according to claim 1, wherein:
the reinforced cross-sectional portion extends over an entirety of a length of the first fastening segment.

9. A spoke according to claim 1, wherein:
the reinforced cross-sectional portion extends over a length of the first fastening segment that is greater than 2 millimeters from the transitional zone.

10. A spoke according to claim 1, wherein:
said spoke is a first spoke;
said first spoke being in combination with a second spoke, said first and second spokes extending in continuity so as to form a diametrical assembly of two spokes.

11. A spoke according to claim 1, wherein:
in the reinforced cross-sectional portion, a width of the spoke is substantially equal to a width of the spoke in the median portion of the body, said widths adapted to be oriented perpendicular to a rotational axis of the wheel.

12. A spoke according to claim 1, wherein:
each of the first and second fastening elements has a length greater than 30 mm.

13. A spoke for a tension spoke wheel, said spoke comprising:
    a tension body comprising a median portion, a first end and a second end, said median portion extending along a length of the tension body between said first end and said second end;
    a first fastening segment extending from said first end of said body and a second fastening segment extending from said second end of said body;
    said tension body and said fastening segments of said spoke being made of a composite material;
    at least one of the fastening segments having an embedding portion adapted to be embedded in a rim or a hub, said embedding portion extending from said body in a direction substantially parallel to an outer surface of the rim or the hub, said outer surface facing axially outwardly of a median plane of the rim, the body and the fastening segments being connected by respective transitional zones;
    the body having a predefined cross section and perimeter in the median portion of the body;

at least one cross-sectional portion reinforced in cross section relative to the cross section of the median portion, the reinforced cross-sectional portion extending through at least one said transitional zone between the tension body and said one of the fastening segments adapted to be embedded in the rim or the hub;

in the reinforced cross-sectional portion, the spoke having a width and a thickness, the width extending perpendicular to the thickness and being greater than the thickness, the width of the spoke in the reinforced cross-sectional portion being substantially equal to a width of the spoke in the median portion of the body.

14. A spoke according to claim 13, wherein:
in the reinforced cross-sectional portion, the widths of the spoke in the reinforced cross-sectional portion and in the median portion of the body are adapted to be oriented perpendicular to a rotational axis of the wheel.

15. A spoke according to claim 13, wherein:
said embedding portion of said one of the fastening segments has a non-circular cross section.

16. A spoke according to claim 13, wherein:
the embedding portion of said one of the fastening segments has a non-circular cross section and is adapted to be embedded in the rim.

17. A tension spoke wheel comprising:
a rim;
a hub:
at least one of the rim and the hub being a component made of a composite material comprising fibers and a resin matrix;
at least one connection spoke between the rim and the hub, said spoke comprising:
  a tension body comprising a median portion, a first end and a second end, said median portion extending along a length of the tension body between said first end and said second end;
  a first fastening segment extending between a first end of the spoke and said first end of said tension body and a second fastening segment extending between a second end of the spoke and said second end of said tension body, the tension body and the fastening segments being bounded by respective transitional zones;
  said tension body and said fastening segments of said spoke being made of a composite material;
  at least the first fastening segment comprising an embedding portion being fastened and embedded within said composite material component by means of glue or by means of the resin matrix of the composite material component;
  the first fastening segment fastened and embedded within said composite material component being embedded within said rim;
  the body having a cross section and perimeter in the median portion of the body;
  at least one cross-sectional portion having a thickness reinforced in cross section relative to the cross section of the median portion of the tension body, said thicknesses extending substantially parallel to a rotational axis of the hub;
  a predetermined one of said at least one reinforced cross-sectional portion extending along a portion of the first end of the tension body, through at least one said transitional zone, and along a portion of the embedding portion of the first fastening segment.

18. A wheel according to claim 17, wherein:
the spoke comprises:
  a zone hidden by the rim or by the hub;
  a visible zone not hidden by the rim or by the hub;
the reinforced cross-sectional portion extends through at least one of the transitional zones between the visible zone and the zone hidden by the rim.

19. A wheel according to claim 17, wherein:
both the rim and the hub body are made of a composite material.

20. A wheel according to claim 17, wherein:
in the reinforced cross-sectional portion, a width of the spoke is substantially equal to a width of the spoke in the median portion of the body, said widths being oriented perpendicular to a rotational axis of the wheel.

21. A wheel according to claim 17, wherein:
both the rim and the hub are made of a composite material comprising fibers and a resin matrix;
the first fastening segment is embedded within said rim and is fastened to said rim by means of glue or by means of the resin matrix of the rim;
the second fastening segment is embedded within said hub and is fastened to said hub by means of glue or by means of the resin matrix of the hub.

22. A wheel according to claim 17, wherein:
the first fastening segment has an embedding portion embedded within said composite material component, said embedding portion extending in a direction substantially parallel to an outer surface of the rim.

23. A wheel according to claim 22, wherein:
the first fastening segment has an unexposed terminal end surface.

24. A wheel according to claim 17, wherein:
each of the first and second fastening elements has a length greater than 30 mm.

25. A wheel according to claim 17, wherein:
said first fastening segment is fastened to said composite material component by means of glue.

26. A method of assembling a wheel of claim 17, said method comprising:
fastening and embedding the first fastening segment within said composite material component by inserting the first fastening segment into said composite material component.

27. A method of assembling a wheel according to claim 26, further comprising:
gluing the first fastening segment to said composite material component, said composite material component having been manufactured before said gluing.

28. A tension-spoke wheel comprising:
a rim;
a hub:
at least one of the rim and the hub being made of a composite material;
at least one connection spoke between the rim and the hub, said spoke comprising:
  a tension body comprising a median portion, a first end and a second end, said median portion extending between said first end and said second end;
  a first fastening segment extending from said first end of said body and a second fastening segment extending from said second end of said body;
  at least one of the fastening segments having an embedding portion embedded in a rim or a hub, said embedding portion extending from said body in a direction substantially parallel to an outer surface of the rim or the hub, said outer surface facing axially outwardly of a median plane of the rim, the body and the fastening segments being connected by respective transitional zones;

the body having a predefined cross section and perimeter in the median portion of the body;

at least one cross-sectional portion reinforced in cross section relative to the cross section of the median portion, the reinforced cross-sectional portion extending through at least one said transitional zone between the tension body and said one of the fastening segments embedded in the rim or the hub;

said tension body and said fastening segments of said spoke being made of a composite material;

in the reinforced cross-sectional portion, the spoke having a width and a thickness, the thickness extending substantially parallel to a rotational axis of the hub, the width extending perpendicular to the thickness and being greater than the thickness, the width of the spoke in the reinforced cross-sectional portion being substantially equal to a width of the spoke in the median portion of the body, the thickness of the spoke in the reinforced cross-sectional portion being greater than a thickness of the spoke in the median portion of the body.

29. A wheel according to claim 28, wherein:
both the rim and the hub are made of a composite material comprising fibers and a resin matrix;
the first fastening segment is embedded within said hub and is fastened to said hub by means of glue or by means of the resin matrix of the hub;
the second fastening segment is embedded within said rim and is fastened to said rim by means of glue or by means of the resin matrix of the rim.

30. A wheel according to claim 28, wherein:
said one of the fastening segments has an unexposed terminal end surface.

31. A wheel according to claim 28, wherein:
the one of the fastening segments having an embedding portion is embedded in the rim.

32. A spoke for a tension-spoke wheel, said spoke comprising:
a tension body comprising a median portion, a first end and a second end, said median portion extending along a length of the tension body between said first end and said second end;
a first fastening segment extending between a first end of the spoke and said first end of said tension body and a second fastening segment extending between a second end of the spoke and said second end of said tension body;
said tension body and said first and second fastening segments of said spoke being made of a composite material;
at least the first fastening segment comprising an embedding portion constructed and arranged to be embedded in a rim, said embedding portion having a non-circular cross section;
said embedding portion of the first fastening segment extending in a direction from the first end of the tension body to be sandwiched between two layers of the rim;
said first end of the spoke comprising a size and a shape to be received and retained within the rim;
the tension body and the fastening segments being bounded by respective transitional zones;
the tension body having a cross section and perimeter in the median portion of the tension body;
at least one cross-sectional portion reinforced in cross section relative to the cross section of the median portion of the tension body, a predetermined one of said at least one reinforced cross-sectional portion extending along a portion of the first end of the tension body, through at least one said transitional zone, and along a portion of the embedding portion of the first fastening segment;
each of said at least one reinforced cross-sectional portion having a thickness greater than a thickness of the median portion, said thickness extending to be substantially parallel to a rotational axis of the wheel.

33. A tension spoke wheel comprising:
a rim;
a hub;
at least one of the rim and the hub being a component made of a composite material comprising fibers and a resin matrix;
at least one connection spoke between the rim and the hub, said spoke comprising:
a tension body comprising a median portion, a first end and a second end, said median portion extending along a length of the tension body between said first end and said second end;
a first fastening segment extending between a first end of the spoke and said first end of said tension body and a second fastening segment extending between a second end of the spoke and said second end of said tension body, the tension body and the fastening segments being bounded by respective transitional zones;
said tension body and said fastening segments of said spoke being made of a composite material;
at least the first fastening segment comprising an embedding portion being fastened and embedded within said composite material component by means of glue or by means of the resin matrix of the composite material component;
said embedding portion of the first fastening segment extends extending in a direction from the first end of the tension body and is sandwiched between two layers of the rim;
the body having a cross section and perimeter in the median portion of the body;
at least one cross-sectional portion having a thickness reinforced in cross section relative to the cross section of the median portion of the tension body, said thicknesses extending substantially parallel to a rotational axis of the hub;
a predetermined one of said at least one reinforced cross-sectional portion extending along a portion of the first end of the tension body, through at least one said transitional zone, and along a portion of the embedding portion of the first fastening segment.

34. A spoke for a tension-spoke wheel, said spoke comprising:
a tension body comprising a median portion, a first end and a second end, said median portion extending along a length of the tension body between said first end and said second end;
a first fastening segment extending between a first end of the spoke and said first end of said tension body and a second fastening segment extending between a second end of the spoke and said second end of said tension body;
said tension body and said first and second fastening segments of said spoke being made of a composite material;

at least the first fastening segment comprising an embedding portion constructed and arranged to be embedded in a rim or a hub, said embedding portion having a non-circular cross section;

said first end of the spoke comprising a size and a shape to be received and retained within the rim or the hub;

the tension body and the fastening segments being bounded by respective transitional zones;

the tension body having a cross section and perimeter in the median portion of the tension body;

at least one cross-sectional portion reinforced in cross section relative to the cross section of the median portion of the tension body, a predetermined one of said at least one reinforced cross-sectional portion extending along a portion of the first end of the tension body, through at least one said transitional zone, and along a portion of the embedding portion of the first fastening segment;

each of said at least one reinforced cross-sectional portion having a thickness greater than a thickness of the median portion, said thickness extending to be substantially parallel to a rotational axis of the wheel;

each of the at least one reinforced cross-sectional portion forming an elbow, whereby the first fastening segment and the tension body extend in divergent directions.

35. A tension spoke wheel comprising:

a rim;

a hub:

at least one of the rim and the hub being a component made of a composite material comprising fibers and a resin matrix;

at least one connection spoke between the rim and the hub, said spoke comprising:

a tension body comprising a median portion, a first end and a second end, said median portion extending along a length of the tension body between said first end and said second end;

a first fastening segment extending between a first end of the spoke and said first end of said tension body and a second fastening segment extending between a second end of the spoke and said second end of said tension body, the tension body and the fastening segments being bounded by respective transitional zones;

said tension body and said fastening segments of said spoke being made of a composite material;

at least the first fastening segment comprising an embedding portion being fastened and embedded within said composite material component by means of glue or by means of the resin matrix of the composite material component;

the body having a cross section and perimeter in the median portion of the body;

at least one cross-sectional portion having a thickness reinforced in cross section relative to the cross section of the median portion of the tension body, said thicknesses extending substantially parallel to a rotational axis of the hub;

a predetermined one of said at least one reinforced cross-sectional portion extending along a portion of the first end of the tension body, through at least one said transitional zone, and along a portion of the embedding portion of the first fastening segment;

said predetermined one of said at least one reinforced cross-sectional portion forming an elbow, whereby the first fastening segment and the tension body extend in divergent directions.

* * * * *